(12) United States Patent
Kracke

(10) Patent No.: US 8,640,917 B2
(45) Date of Patent: Feb. 4, 2014

(54) MULTIPLE-USE DISPENSER FOR ARTICLES CONTAINED IN BLISTER-TYPE PACKAGES

(75) Inventor: Andreas W Kracke, Riehen (CH)

(73) Assignee: Novartis AG, Basel (CH)

( * ) Notice: Subject to any disclaimer, the term of this patent is extended or adjusted under 35 U.S.C. 154(b) by 218 days.

(21) Appl. No.: 13/147,873

(22) PCT Filed: Feb. 5, 2010

(86) PCT No.: PCT/EP2010/051424
§ 371 (c)(1),
(2), (4) Date: Aug. 4, 2011

(87) PCT Pub. No.: WO2010/089373
PCT Pub. Date: Aug. 12, 2010

(65) Prior Publication Data
US 2011/0290820 A1    Dec. 1, 2011

(30) Foreign Application Priority Data
Feb. 6, 2009 (EP) .................................. 09152274

(51) Int. Cl.
*B65D 83/04* (2006.01)
(52) U.S. Cl.
USPC ........ 221/268; 221/302; 221/312 C; 206/538; 206/531
(58) Field of Classification Search
USPC .............. 221/268, 276, 302, 312 C; 206/528, 206/531, 534.1, 534.2, 538, 539
See application file for complete search history.

(56) References Cited

U.S. PATENT DOCUMENTS

| 2,971,638 | A  | * | 2/1961  | Crawford et al. ............. | 206/532 |
|-----------|----|---|---------|-------------------------------|---------|
| 5,150,793 | A  |   | 9/1992  | Tannenbaum                    |         |
| 5,244,091 | A  |   | 9/1993  | Tannenbaum                    |         |
| 5,954,202 | A  | * | 9/1999  | Mellon ......................... | 206/462 |
| 6,394,275 | B1 | * | 5/2002  | Paliotta et al. ................ | 206/531 |
| 6,659,280 | B2 | * | 12/2003 | Paliotta et al. ................ | 206/531 |
| 6,705,467 | B1 | * | 3/2004  | Kancsar et al. ............... | 206/531 |
| 6,708,825 | B2 | * | 3/2004  | Filion et al. ................... | 206/531 |
| WO        | WOA1 | * | 6/2004 |                               |         |
| 2004052749 |   |   |         |                               |         |

(Continued)

FOREIGN PATENT DOCUMENTS

RU         2261200         9/2005
WO   WO 2004/052749       6/2004

(Continued)

*Primary Examiner* — Patrick Mackey
(74) *Attorney, Agent, or Firm* — Carmella O'Gorman

(57) ABSTRACT

A multiple-use dispenser (1) for articles contained in blister-type packages (100), in particular for pharmaceutical products such as pills, tablets, capsules and like articles, comprising a housing (2) with at least one opening for dispensing an article from a blister-type package contained therein, The housing (2) comprises a front and a rear sheet (3,4) which are interconnected with each other along their longitudinal edges and have a closed end (5) and an open end (6) on opposite longitudinal ends thereof. The front and rear sheets (3, 4) each are provided with at least one opening (30,40) which are in permanent registry with one another. A shutter sheet (9) is provided within the housing (2) and adapted to be moved longitudinally from a first end position, in which the openings (30, 40) are closed by the shutter (9) to a second end position, in which an aperture (90) of the shutter sheet (9) is in registry with the openings (30, 40) in the front and rear sheets (3, 4). Between the shutter sheet (9) and the front sheet (3) of the housing (2) there is provided a compartment (11) for a blister-type package (100).

10 Claims, 6 Drawing Sheets

(56) References Cited

U.S. PATENT DOCUMENTS

| | | | |
|---|---|---|---|
| 6,896,138 B2 * | 5/2005 | Rock et al. | 206/531 |
| 7,000,768 B2 * | 2/2006 | Morita et al. | 206/531 |
| 7,325,689 B2 * | 2/2008 | Buss | 206/532 |
| 7,784,250 B2 * | 8/2010 | Grosskopf | 53/453 |
| 7,896,161 B2 * | 3/2011 | Reilley et al. | 206/531 |

FOREIGN PATENT DOCUMENTS

| | | |
|---|---|---|
| WO | WO 2006/069814 | 6/2006 |
| WO | 2007/048906 | 5/2007 |

* cited by examiner

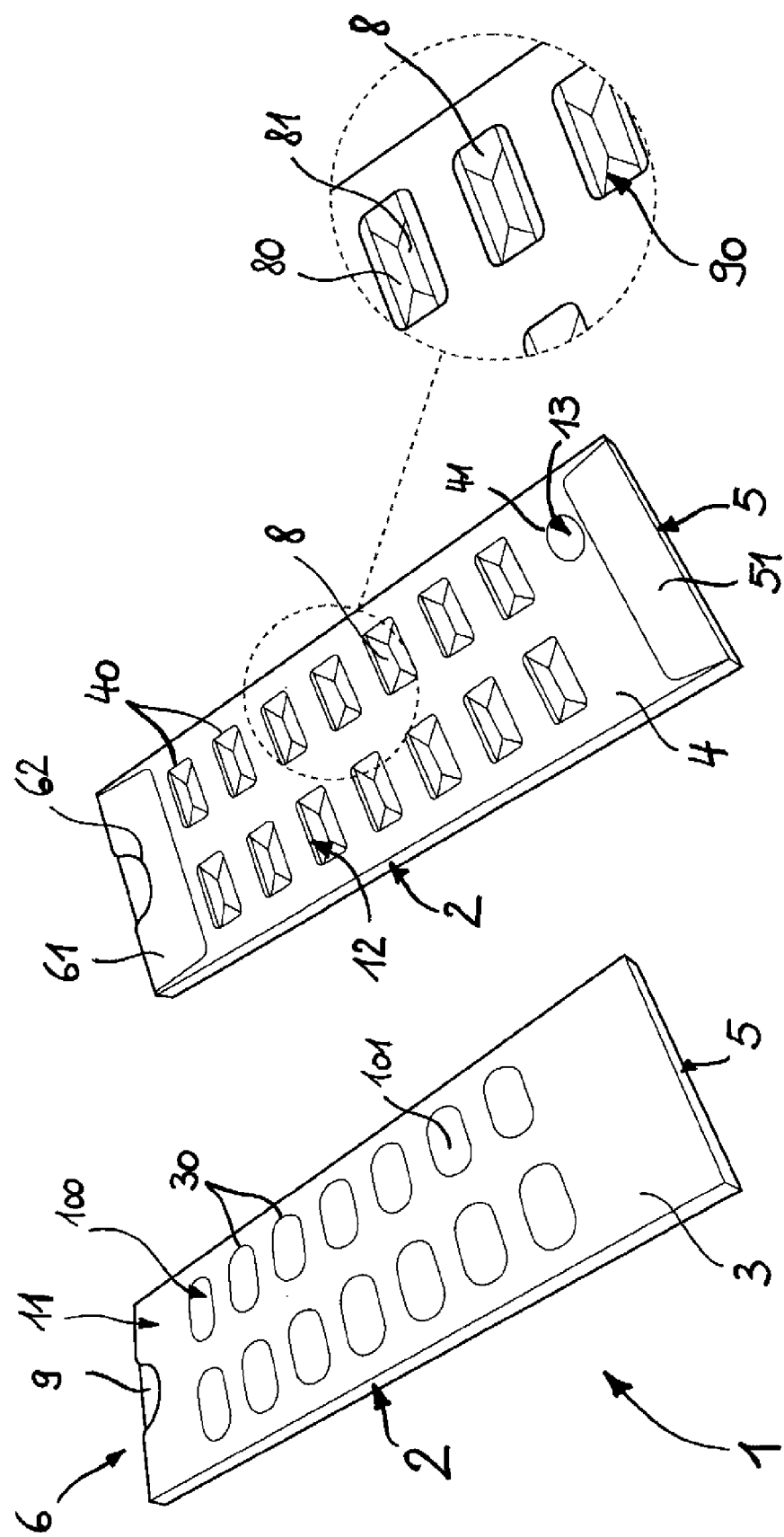

MULTIPLE-USE DISPENSER FOR ARTICLES CONTAINED IN BLISTER-TYPE PACKAGES

This application is a 371 of PCT/EP2010/051424, filed Feb. 5, 2010, which claims benefit of EP 09152274.8, filed Feb. 6, 2009, which in their entirety are herein incorporated by reference.

The invention concerns a multiple-use dispenser for articles contained in blister-type packages in accordance with the pre-characterizing clause of claim 1.

Pharmaceutical products, such as pills, tablets, capsules and the like are often packaged in so-called blister-type packages or containers to facilitate removal but inhibit contamination and tampering of the product. Blister-type packages usually comprise a layer of transparent or translucent plastic which is provided with outwardly extending compartments, cavities or blisters for receiving the pharmaceutical product. A rupturable or puncturable second layer, which is very often made of aluminum foil, is laminated to the open side of the plastic layer. By applying force to a blister in the plastic layer the pharmaceutical product is pressed against the second layer which thereby is ruptured or punctured for removal of the product.

Pills, tablets, capsules and the like are often shaped, sized and colored for the convenience of the patient and those persons administrating the pharmaceutical product. This is the case in human as well as in animal health. Children may mistake such products with candy and may ingest them. This may lead to hazardous situations, because any pharmaceutical product should only be administrated if there is need, and even then only in the prescribed dosage. Thus, with many pharmaceutical products young children, unaware of the danger of ingestion of such products, may even poison themselves inadvertently.

In some countries governmental authorities require "child-resistant" packages for pharmaceutical or veterinary products. Therefore, in the past various attempts have been made to inhibit children from the removal of pharmaceutical products from such packages. In U.S. Pat. No. 5,150,793 and in U.S. Pat. No. 5,244,091 blister-type packages have been suggested which are movable between a first and a second end position with respect to a sheet of material which is provided with at least one opening. When a blister is in alignment with the opening in the sheet the pharmaceutical product contained therein may be removed. The suggested solutions to the need for child resistant blister-type packages are rather complex and do not appear very practical and reliable. The packages are for single use only. Once the blister-type package is emptied the whole package must be discarded.

Hence, there still exists a need for a device which inhibits children from accessing and accidentally ingesting hazardous articles, in particular pharmaceutical products such as pills, tablets, capsules and the like which are frequently provided in blister-type packages. The device shall be easy and economic to manufacture; it shall be safe and reliable in use, thus inhibiting children from accessing the hazardous products and, at the same time be easy and self-explanatory in use for the person using the device, in case of a pharmaceutical product for the patient or the person administering the pharmaceutical product. A child-resistant device shall be provided which enables a dispensing of the pharmaceutical products accommodated in blister-type packages in accordance with prescription. Once a blister-type package is emptied the device shall be re-loadable with another full blister-type package and re-usable.

These and other objects are met by a multiple-use dispenser for articles contained in blister-type packages in accordance with claim 1. Preferred and/or particularly advantageous embodiments are the subject of the respective dependent claims. In the following, by way of example it will only be referred to a pharmaceutical product or article, however, the invention is not limited thereto and is also suitable for other (hazardous) articles.

In accordance with the invention a multiple-use dispenser for articles contained in blister-type packages, in particular pharmaceutical products such as pills, tablets, capsules and like articles, is provided, which comprises a housing with at least one opening for dispensing an article from a blister-type package contained therein. The housing comprises a front and a rear sheet which are interconnected with one another along their longitudinal edges and which have a closed end and an open end on opposite longitudinal ends thereof. The front and rear sheets each are provided with at least one opening, the openings of the front and rear sheets being in permanent registry with one another. The dispenser further comprises a shutter sheet arranged within the housing, the shutter sheet being adapted to be moved longitudinally from a first end position in which the respective at least one opening in the front and rear sheets is closed by the shutter, to a second end position in which an aperture of the shutter sheet is in registry with the respective at least one opening in the front and rear sheets. The shutter sheet is resiliently biased towards the first end position in which it closes the respective at least one opening in the front and rear sheets. Between the shutter sheet and the front sheet of the housing a compartment is provided for accommodating a blister-type package.

The dispenser according to the invention is simple in construction and in use. The housing is provided with a compartment for accommodating a blister-type package containing the pharmaceutical article(s), such as, e.g., pills, tablets, capsules and like articles. Openings in the front and rear sheets of the housing are in permanent registry with each other. This design simplifies the manufacture and alignment of the front and rear sheets. In order to prohibit a dispensing of a pharmaceutical article from a blister there is provided a shutter sheet, which, in a first end position thereof, closes the openings in the front and rear sheets. The shutter is provided with at least one apertures and is adapted to be actuated and moved into a second end position, in which its aperture or apertures are in registry with the openings in the front and rear sheets. With the shutter sheet in its second end position in which the aperture or apertures of the shutter sheet is in registry with the corresponding openings in the front and rear sheets, these opening are freely communicating with one another. By pressing against a blister a pharmaceutical article penetrates or punctures a second layer (typically an aluminum layer) of the blister-type package and may be dispensed through the opening in the rear sheet. After dispensing the pharmaceutical article the shutter sheet is released and, due to a resilient biasing, the shutter sheet returns to its first end position in which it closes the openings in the front and rear sheets. Once the blister-type package is emptied, it may be removed through the open end of the housing, and a new one may be inserted into the compartment. In order to improve child-resistancy, the end of the housing may be provided with a child-resistant mechanism so that removal of an empty blister-type package and insertion of a new blister-type package through the ned of the housing cannot be performed by children up to a certain age. Thus, the dispenser is adapted for multiple use. The function of the multiple-use dispenser is self-explanatory to an adult and may also be easily performed by elderly people. At the same time the device is child-resistant because it requires two separate, but simultaneous manipulations, namely actuation of the shutter and applying pressure on the blister, for the dispensing of an article from the blister-type package; children up to the age of about 51 months are not capable of performing these simultaneous actions and, therefore, the dispenser according to the invention is deemed "child-resistant".

The multiple-use dispenser may be adapted for blister-type packages comprising only one cavity, e.g., for accommodating a syringe or a cartridge for a syringe. Pharmaceutical articles, such as, e.g., pills, tablets, and capsules usually are packaged in larger numbers in blister-type packages. Accordingly, in one embodiment of the invention the front and rear sheets are each provided with a plurality of openings, the openings in the front and rear sheets being in permanent registry with one another. The shutter sheet is provided with a corresponding plurality of apertures which are arranged in a manner corresponding to the arrangement of the openings in the front and rear sheets.

Very often the blisters of a blister-type package are arranged in two longitudinal columns. Accordingly, in a further embodiment of the invention the openings in the front and rear sheets are arranged in two longitudinal columns. The shutter sheet is provided with a corresponding arrangement of apertures, wherein in the first end position of the shutter sheet in which it closes the openings in the front and rear sheets, the apertures in the shutter sheet are in registry with (closed) web material portions of the front and rear sheets between adjacently arranged openings of the longitudinal columns of openings in the front and rear sheets.

Often pharmaceutical articles must be administered daily, in single doses once or twice a day. Correspondingly, such pharmaceutical articles are often available in blister-type packages with two columns of seven blisters each, or with a multiple thereof. Each blister contains a single dose of the pharmaceutical article. Therefore, in a still further embodiment of the multiple-use dispenser according to the invention seven openings are arranged in each longitudinal column of openings. The shutter sheet of this embodiment is provided with a corresponding arrangement of apertures. With this kind of multiple-use dispenser a patient or a person administrating the pharmaceutical product has control over a full week of administration (in case of two doses a day) or of two weeks administration (in case of one dose a day). As an additional support the weekdays may be printed on the front and/or rear sheets next to the pairs of openings occupying each row. In case of an administration twice a day, the columns may be designated A.M. and P.M., respectively. The shutter sheet may also have the weekdays printed on the web material in between the apertures, such that they are legible for the person handling the multiple-use dispenser.

In a still further embodiment of the multiple-use dispenser according to the invention the housing further comprises a separating sheet extending longitudinally and separating the housing into a front compartment for accommodating the blister-type package, and a rear compartment for the shutter sheet. The separating sheet is provided with apertures, which are in permanent registry with the openings in the front and rear sheets and which each are partially closed by at least one closure flap that is hingedly attached to the separating sheet at a lower nm of each aperture. Advantageously the closure flaps are formed integrally with the separating sheet. Separating the housing into two compartments simplifies assembly of the multiple-use dispenser and of the loading thereof with the blister-type package. By having the shutter sheet separated from the blister-type package, residue from the rupturable or puncturable second layer (typically aluminum layer) of the blister package cannot interfere with the longitudinal actuation of the shutter sheet. When a respective blister is emptied, the closure flaps at a corresponding aperture of the shutter sheet is bent outwardly towards the registering opening in the rear sheet. When the shutter sheet slides back into its starting position, the first end position towards which it is biased, any rest of the severed second layer of the blister-type package, which may protrude through the aperture and the respective opening in the rear sheet, is shoved back into the housing and pressed into the respective emptied blister cavity. Thus, the closure flaps in the apertures of the separation sheet ensure an unhindered actuation of the shutter sheet and a clean appearance of the dispenser from the outside.

In an advantageous embodiment of the multiple-use dispenser the front and rear sheets and the separating sheet are interconnected with each other to form one material sheet, which is foldable along folding lines. This embodiment of the invention is particularly easy to manufacture and to assemble.

The material sheet may be of made of cardboard or plastic which are cheap materials and may be easily provided with printing if desired. The shutter sheet may also be made of cardboard, or it may be made of plastic.

In order to enable an easy actuation of the shutter sheet, at the open end of the housing the front and rear sheets each are provided with a central recess allowing access to the shutter sheet. In this embodiment of the invention the shutter sheet does not protrude beyond the open end of the housing.

Advantageously, the front and rear sheets at the open end are provided with a closure element for repeatedly closing and opening the housing. This closure element is preferably child-resistant and releasable in order to enable a replacement of the blister-type package.

Sometimes, the dose of the pharmaceutical article contained within one blister (cavity) of the blister-type package is too high for an individual administration. This may particularly be the case in veterinary applications, in which the dose is often depending on the weight of the animal patient, but also occurs in the treatment of humans. Then only a portion, usually one half, of a pill or tablet is administrated. In order to avoid that the rest of the pharmaceutical article is disposed of, in a further embodiment of the multiple-use dispenser the rear sheet is provided with an additional opening which is in registry with a cavity. The shutter sheet comprises an additional aperture arranged such that in the first end position of the shutter, the shutter closes the cavity while in the second end position the additional aperture allows access thereto. The size of this additional opening and cavity is large enough to accommodate half of the pill or tablet for later use. With the shutter sheet in its initial first end position the additional opening is closed, and the half pill or tablet cannot fall out of the cavity. A releasable and reattachable transparent foil may be provided on the outer surface of the rear sheet extending over the additional opening, so that unintentional falling out of a half pill or tablet through the additional opening is prevented in case the dispenser is held in a manner such that the additional opening faces downwardly and the shutter sheet is in its second end position (open position).

In order to resiliently force the shutter sheet into the first end position the shutter may be provided with a spring-like element at a longitudinal foot end thereof. The spring element is supported by the closed end of the housing in the assembled state. The cavity may be provided in a body of the spring-like element, which is mounted to the longitudinal foot end of the shutter sheet. The spring-like element may be shaped as a kind of a blade spring. Preferably it is made of plastic.

In order to improve the child-resistance of the multiple-use dispenser even more, the housing may have longitudinal and transversal extensions which exceed an average grip-width of the hands of children up to 51 months.

For further convenience of the patient or the person administrating the pharmaceutical article in another embodiment of the multiple-use dispenser there is provided an outer, secondary package, in which the housing and at least one blister-type package containing the pharmaceutical article(s) are unloosably but releasably accommodated. Thus, the pharmaceutical article and the multiple-use dispenser may be offered as a set. For example, the secondary package may be of the folder type. For attachment of the housing and the blister-type package(s) at the inside of the secondary package a strip of adhesive tape or the like which allows a repeated attachment and removal, may be provided. The secondary package may also contain printed information about the pharmaceutical product and about the mode of administration thereof.

The multiple-use dispenser according to any one of the embodiments of the invention is particularly useful for the dispensing and administration of pharmaceutical articles, such as, e.g., pills, tablets, capsules and like articles according to prescription. It may be used for the dispensing and administration of pharmaceutical articles for the treatment of humans or animals.

Further advantages of the invention will become apparent from the following detailed description of an exemplary embodiment of a multiple-use dispenser, reference being made to the schematic drawings which are not to scale, in which:

FIG. 1 shows a perspective top view of an embodiment of the multiple-use dispenser according to the invention;

FIG. 2 is a perspective rear view of the multiple-use dispenser of FIG. 1;

FIG. 3 is an enlarged view of the encircled portion in FIG. 2;

Figure 5:
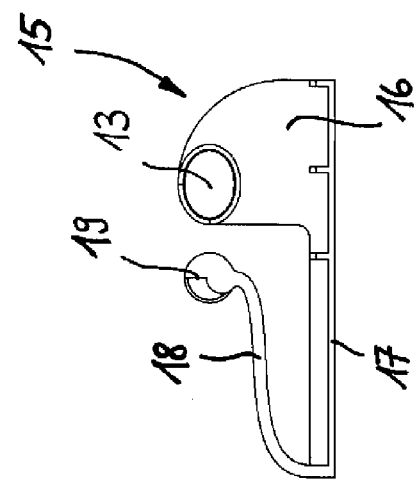
FIG. 5 is an enlarged view of the spring element of FIG. 4.

In the following description of the figures the designations top and bottom, front and rear, left and right, outside etc. are used for convenience only and are not limiting. In FIGS. 1-3 an exemplary embodiment of a multiple-use dispenser is generally designated with reference numeral 1. The dispenser 1 comprises a housing 2 having a front sheet 3 and a rear sheet 4, which are connected to one another along their longitudinal sides. The housing 2 has a closed end 5 and an open end 6, which is partly closed with a closure element 61. In the depicted embodiment of the multiple-use dispenser 1 the closure element 61 is a flap which extends from the front sheet 3 and is releasably attached to the rear sheet 4. Likewise the closed end 5 at a bottom of the housing is formed by a flap 51 which is connected with the front sheet 3 and permanently attached to the rear sheet 4. It is understood by the skilled artisan, that the flaps at the open and closed ends could also be connected with the rear sheet and be attached to the front sheet. The front and rear sheets 3,4 at the open end 6 are provided with a semi-circular central recess 10. By having the closure element 61 provided with a corresponding recess 62, too, the shutter sheet remains accessible through the central recesses 10,62 at the end 6 of the housing.

The front and rear sheets 3, 4 each are provided with a number of openings 30,40 which are in permanent registry with one another. In FIG. 1 a shutter sheet 9 is indicated at the semi-circular central recess 10. The shutter sheet 9 is provided with a number of apertures 90 (see FIG. 3), which are arranged in accordance with the openings 30, 40 in the front and rear sheets 3,4, respectively. The shutter sheet 9 is resiliently biased towards a first end position, in which the openings 30,40 in the front and rear sheets 3, 4 are closed by the web material of the shutter sheet 9 between its openings 90. By pushing the shutter sheet 9 against the resilient biasing force (FIG. 2) into its second end position the apertures 90 of the shutter sheet 9 are brought in registry with the openings 30,40 in the front and rear sheets 3,4, respectively.

FIG. 2 further shows that inside the housing 2 there is provided a separation sheet 8 which has a corresponding number of apertures 80 in permanent registry with the openings 30,40 in the front and rear sheets 3,4. The separation sheet 8 separates the inside of the housing 2 into a front compartment 11 and a rear compartment 12. The front compartment 11 is adapted to accommodate a blister-type package 100 with blisters 101 (FIG. 1). The shape of the openings 30 in the front sheet 3 is adapted to the shape of the blisters 101, such that the blisters 101 can easily protrude through openings 30. This also ensures a correct insertion of the blister-type package 100 into the front compartment 11. The rear compartment 12, which is delimited by the separation sheet 8 and the rear sheet 4, receives the shutter sheet 9. FIG. 2 further shows that the rear sheet 4 is provided with an additional opening 41, which is normally closed, when the shutter sheet 9 is in its first end position. FIG. 2, in which the shutter sheet 9 is pushed into its second end position, shows the additional opening 41 in its open state, in which it is in registry with a cavity 13 inside the housing 2.

FIG. 3 shows the encircled section in FIG. 2 in enlarged scale. From the depiction it becomes clear that the apertures 80 in the separation sheet 8 are partly closed by closure flaps 81. The closure flaps 81 are hingedly attached to the lower rim and to the side rims of the apertures 80 in the separation sheet 8. The function of the closure flaps 81 will become evident from the description below. In FIG. 3 the separation sheet is indicated at 9, its apertures are designated with reference numeral 90.

Figure 4:
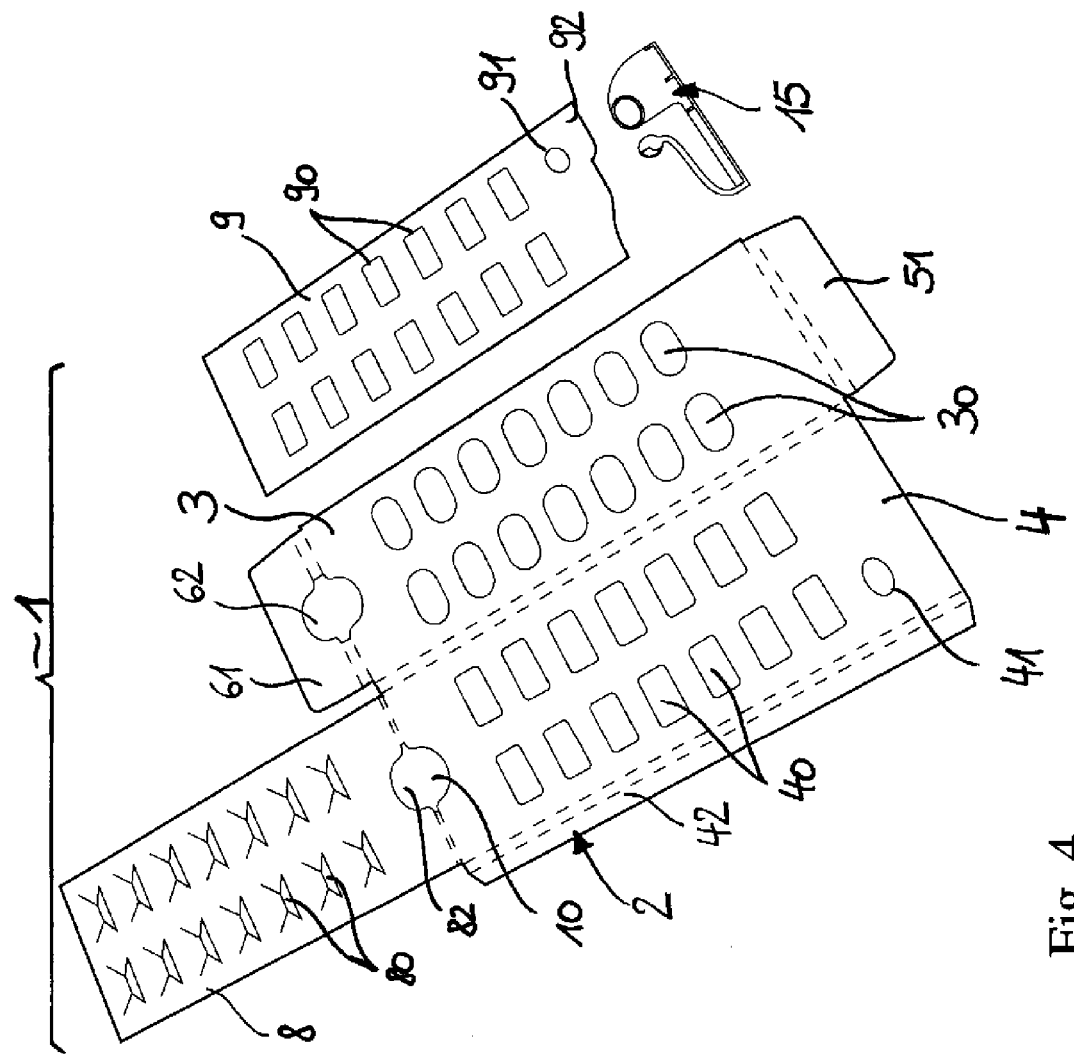
FIG. 4 is an exploded view of the multiple-use dispenser of FIGS. 1-3.

FIG. 4 shows an exploded view of the multiple-use dispenser package 1. In the depicted embodiment the housing 2 is made from one material sheet, which may be of cardboard (eventually it may be made of plastic instead). The front and rear sheets 3,4 and the separation sheet 8 are connected with each other and are foldable along predetermined folding lines which are indicated in hatched lines. The closure element 61 for releasably closing the open end 6 of the housing 2 and the flap 51 for permanently closing the closed end 5 thereof extend from the top and bottom ends of the front sheet 3. In FIG. 4 the rear sheet 4 extends on the left side of the front sheet 3, with the separation sheet 8 extending from the top portion of the rear sheet 4. A longitudinal attachment flap 42 extends from the left side of the rear sheet 4. The oblong openings in the front sheet 3 are designated with reference numeral 30. Their outside contour corresponds to the shape of the blisters of blister-type packages for pills, tablets, or capsules and facilitates the correct insertion of the blister-type package. The openings 40 in the rear sheet are of a generally rectangular shape, which ascertains that the blister-type package may not be inserted in a wrong, inverted manner. The additional opening in the bottom portion of the rear sheet is designated with reference numeral 41. The separation sheet 8 is provided with apertures 80 which are partly closed by hingedly attached closure flaps 81, which are integrally formed with the separation sheet. The numbers of the openings 30,40 in the front and rear sheets 3, 4 and of the apertures 80 in the separation sheet 8, and their arrangements, e.g. in two columns with seven openings each, correspond to each other. When the material sheet is folded along the predetermined folding lines and the housing 2 is assembled the openings 30,40 in the front and rear sheets 3,4 and the partly closed apertures 80 in the separation sheet 8 are in permanent registry with one another. The semi-circular central recesses in the top portions of the front and rear sheets are designated with reference numeral 10. The closure flap 61 is provided with a corresponding recess 62, the separation sheet 8 in its top portion has a corresponding recess 82.

On the right side of FIG. 4 the shutter sheet 9 is shown together with a spring-like element which is designated with reference numeral 15. The shutter sheet 9 is provided with apertures 90, the number of which corresponds to that in the front and rear sheets 3,4, and in the separation sheet 8, respectively. An additional aperture 91 is provided in the bottom portion of the shutter sheet 9, which corresponds to the additional opening 41 in the rear sheet 4. A bottom portion of the shutter sheet 9 which extends below the additional aperture 91 is designated with reference numeral 92. The arrangement of the apertures 90 in the separation sheet 9 basically corresponds to that of the front and rear sheets 3, 4 and of the separation sheet 8 but is such, that in the assembled state of the housing 2 with inserted shutter sheet 9 in its first end position the material of the shutter sheet 8 webs in between adjacently arranged openings and 30,40,80 in the front and rear sheets 3,4 and the separation sheet 8, respectively.

In FIG. 5 the spring-like element 15 of FIG. 4 is shown in an enlarged scale. It comprises a body 16 in which a cavity 13 for a part of a pill or tablet is provided. The cavity 13 corresponds to that mentioned in FIG. 2. From the body 16 of the spring-like element 15 a spring lever arm 18 protrudes which is provided with a sliding fit 19 for receiving the bottom of the shutter sheet. The spring lever arm 18 is resiliently bendable towards a foot 17 of the body 16 of the spring element 15. In the assembled state the foot 17 of the body 16 of the spring like element 15 rests against the closed end of the housing of the multiple-use dispenser.

Figure 6:
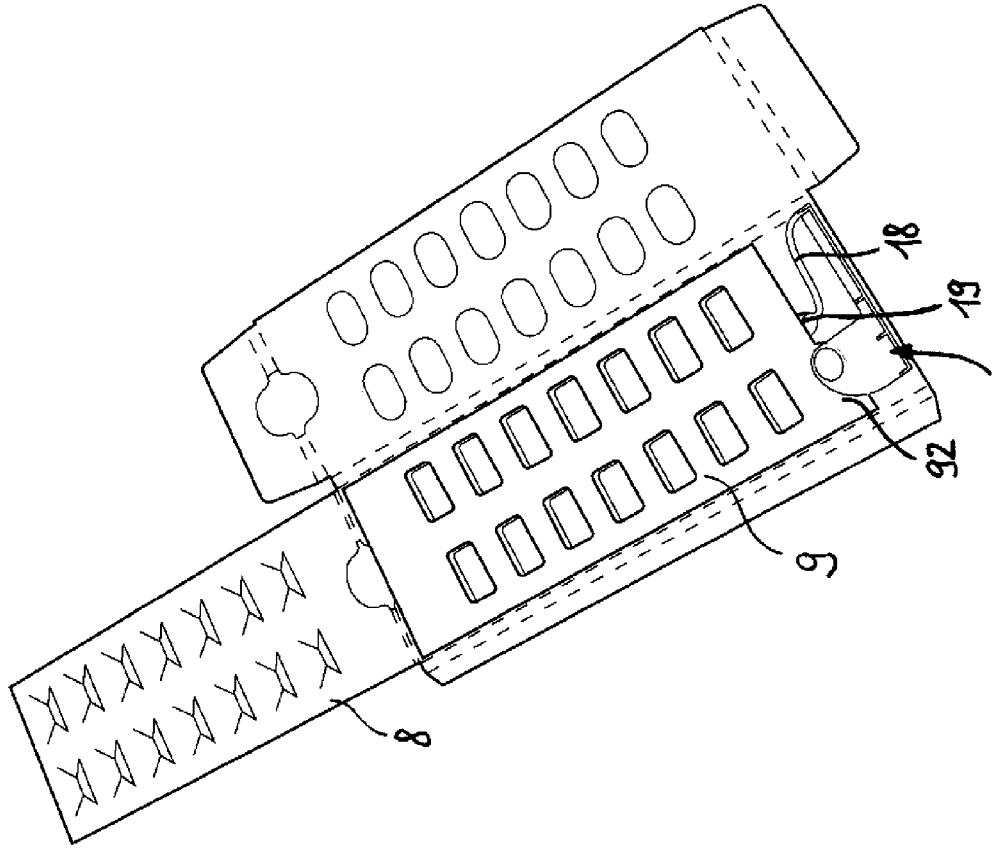

FIG. 6-11 show the multiple-use dispenser 1 in various states of assembly. First the spring-like element 15 is mounted to the shutter sheet 9 by inserting the bottom of the latter into the sliding fit 19 of the spring arm 18. The cavity 13 in the spring-like element 15 is covered by the bottom portion 92 of the shutter sheet 9 below the additional aperture 91. Then the shutter sheet 9 is placed on the rear sheet 4 portion of the unfolded material sheet (FIG. 6). From FIG. 6 it becomes clear that the longitudinal extension of the shutter sheet 9 with mounted spring-like element 15 corresponds to the length of the rear sheet 4. In the released state of the spring-like element 15 the shutter sheet 9 is in its first end position, in which the openings in the rear sheet 4 are covered.

Figure 7:
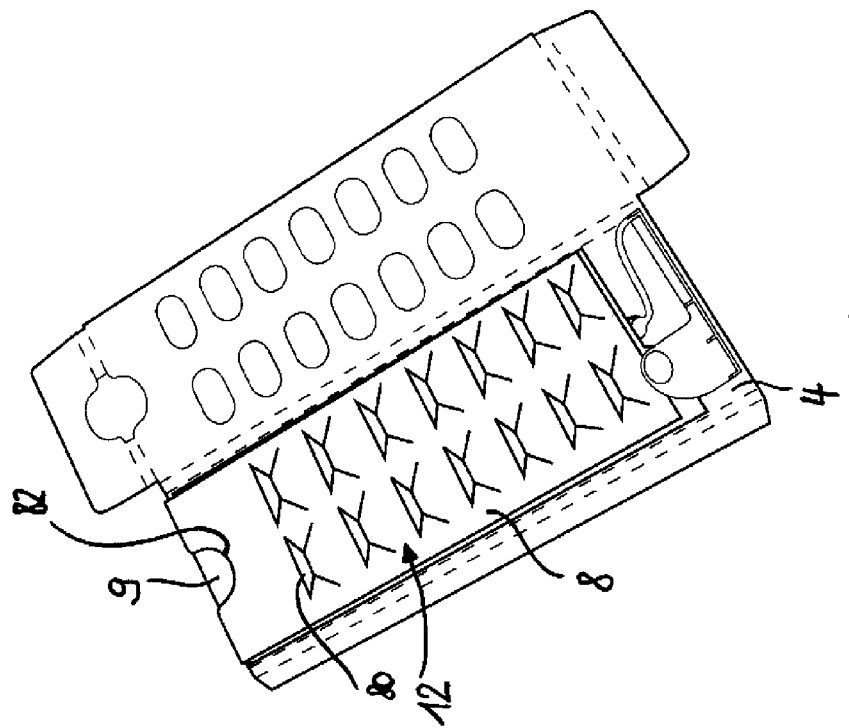
FIGS. 6-11 show the multiple-use dispenser in various states of assembly.

FIG. 7 shows that the separating sheet 8 is folded over the shutter sheet 9. Thus, the separation sheet 8 and the rear sheet 4 delimit a rear compartment 12 in the housing where the shutter sheet 9 is arranged. Recess 82 in the separating sheet 8 allows a view at the top portion of the shutter sheet 9. The apertures 80 in the separation sheet 8 are closed by the material webs of the shutter sheet 9 in between its apertures.

Figure 9:
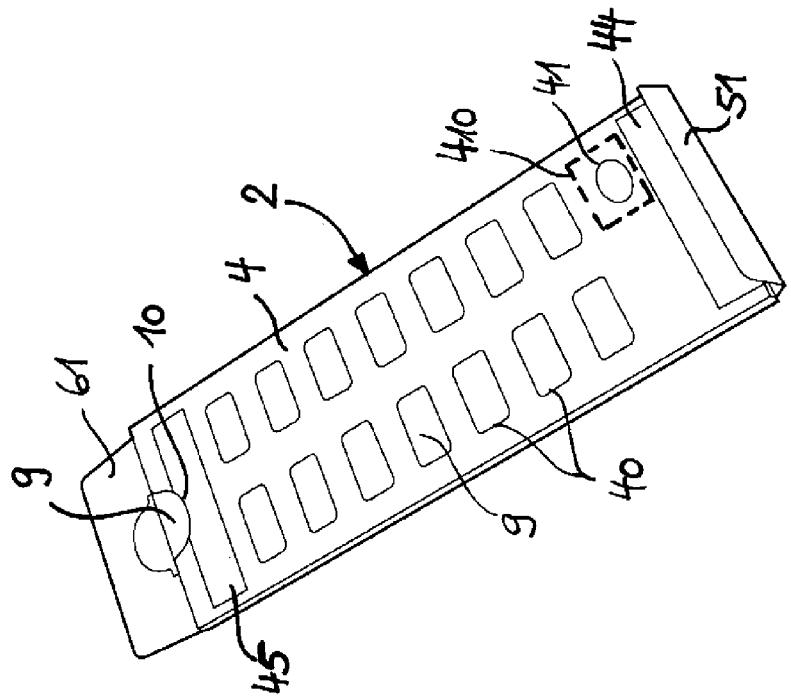
Figure 8:
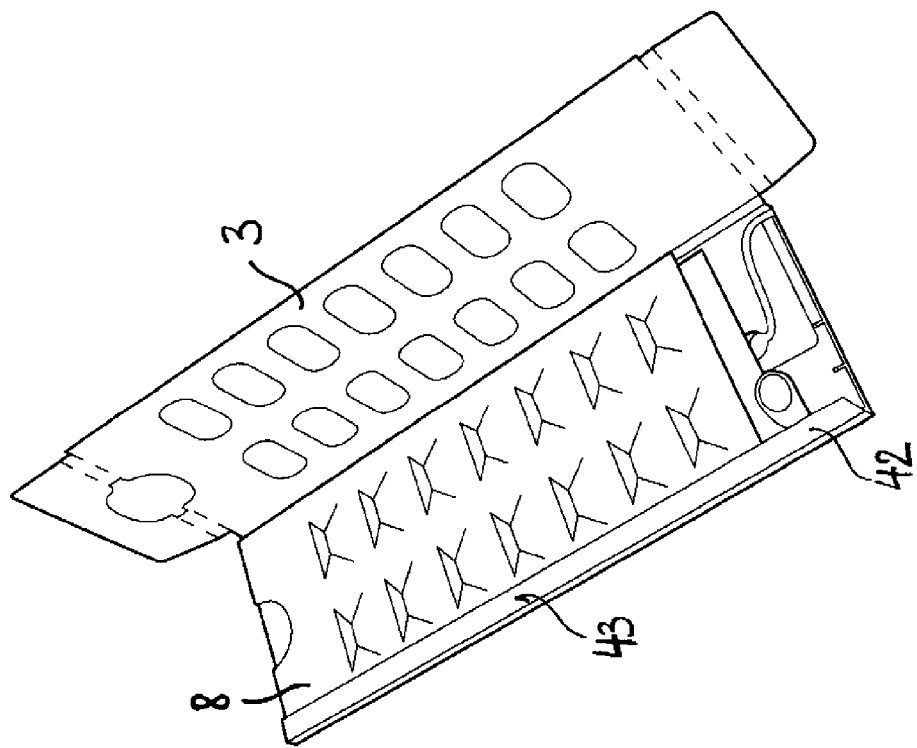

Next the longitudinal attachment flap 42 which extends from the rear sheet 4 is folded towards the separation sheet 8, which is shown in FIG. 8. On its rear side the attachment flap 42 is provided with an adhesive layer 43 for attaching the front sheet 3 thereto. FIG. 9 shows a view at the rear sheet 4 of the housing 2. The front sheet has been attached to the longitudinal attachment flap of the rear sheet 4. Adhesive layers 44, 45 are provided at the top and at the bottom end on the outside of the rear sheet 4 for attaching the flap 51 at the bottom end and closure element 61 at the top end of the rear sheet 4, respectively. Adhesive layer 44 is provided such, that a permanent attachment of the flap 51 to the rear sheet 4 is achieved, while adhesive layer 45 allows a releasable attachment of the closure element 61. The shutter sheet 9 is visible at the central recess 10 in the rear sheet 4 and through the openings 40 in the rear sheet 4. With the shutter sheet 9 in its initial first end position the openings 40 and the additional opening 41 in the rear sheet 4 are closed. A releasable and reattachable transparent foil 410 indicated in dashed lines may be provided on the outer surface of the rear sheet 4 extending over the additional opening 41, so that unintentional falling out of a half pill or tablet through the additional opening 41 is prevented in case the dispenser is held in a manner such that the additional opening 41 faces downwardly and the shutter sheet 9 is in its second end position (open position).

Figure 10:
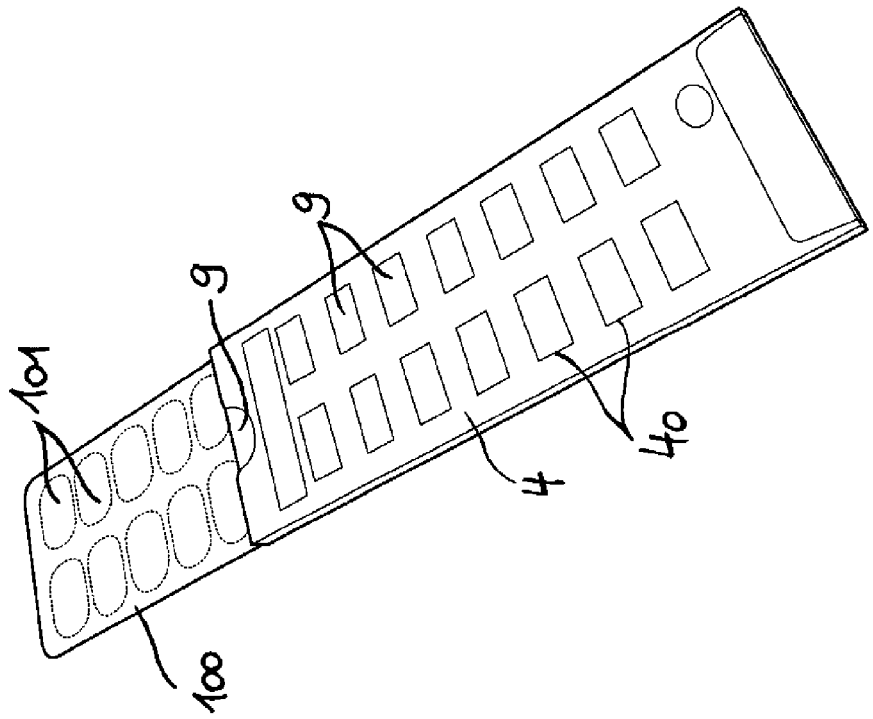

FIG. 10 shows the insertion of a blister-type package 100 into the front compartment 11 in the housing 2, which is delimited by the separation sheet and the front sheet. Flap 52 has been permanently attached to the rear sheet 4 in order to form the closed end of the housing 2. The view is at the rear sheet 4 of the housing 2. Correspondingly, the blister-type package 100 is shown from its rear side, where the blisters 101 are covered by a rupturable or puncturable second layer 102, which is usually made of aluminum foil. The shutter sheet 9 in the rear compartment 12 of the housing 2 is indicated at 9.

Figure 11:
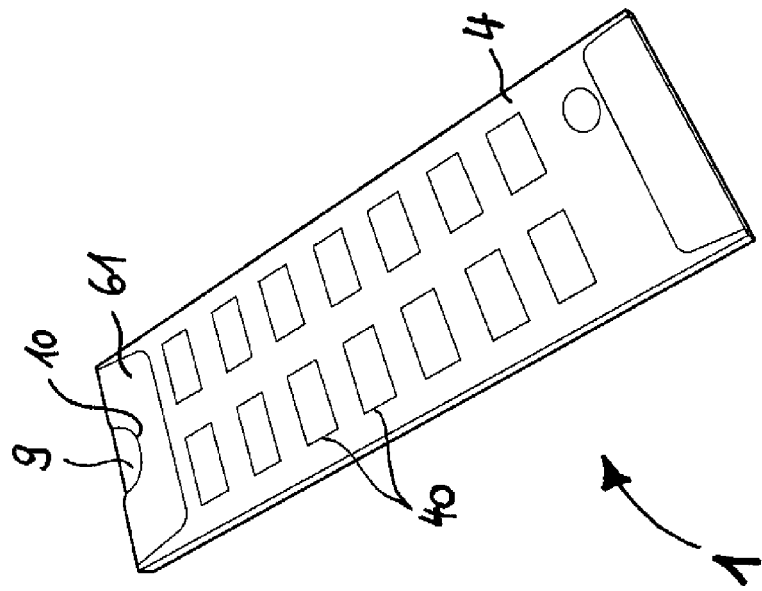

FIG. 11 finally shows the completely assembled multiple-use dispenser 1 which has been loaded with a blister-type package containing pills, tablets, capsules or the like. The closure element 61 has been releasably attached to the rear sheet 4. The shutter sheet 9 is in its initial end position, in which the openings 40 in the rear sheet 4 are closed and is accessible for activation at central recess 10. FIG. 11 basically corresponds to FIG. 2, with the exception that in FIG. 2 the shutter sheet is shown in its activated position in which it is moved into its second end position, thus releasing the openings in the rear sheet.

Figure 12:
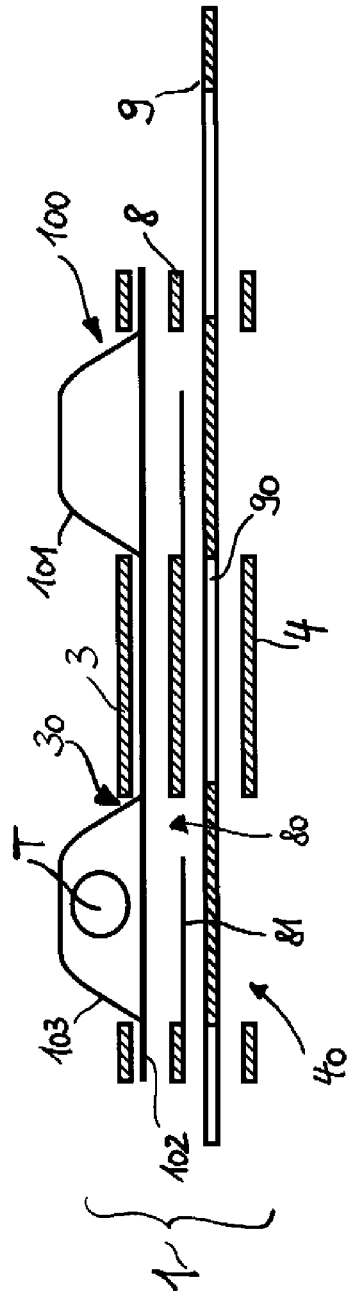
FIGS. 12-14 show the dispenser function in schematic sectional views.
Figure 13:
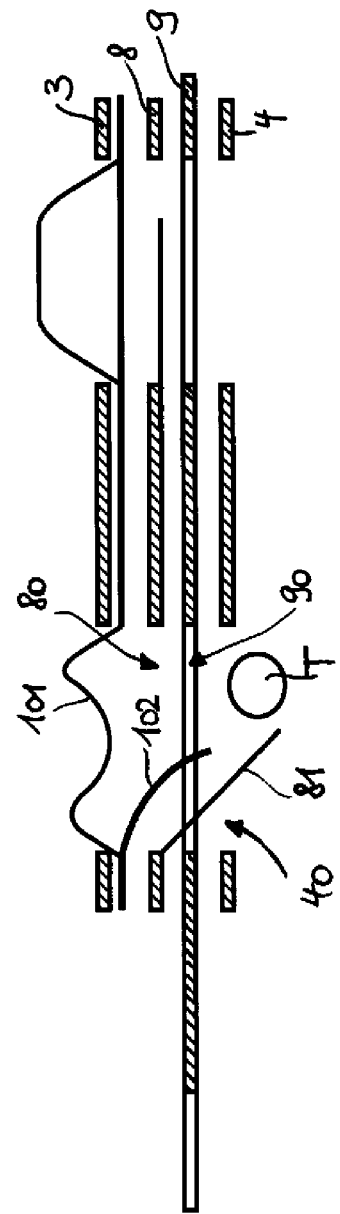
Figure 14:
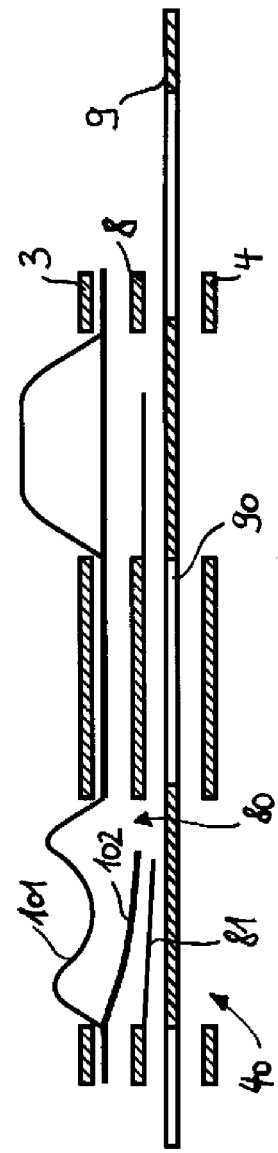

Schematic FIGS. 12-14 illustrate the function of the multiple-use dispenser, which is generally designated with reference numeral 1. The front sheet is assigned reference numeral 3, the rear sheet is assigned reference numeral 4, and the separating sheet is indicated at 8. The front sheet 3 and the rear sheet 4 are provided with respective openings 30 and 40, respectively, which are in permanent registry with one another. The separation sheet 8 has apertures 80, which also are in permanent registry with those of the front and rear sheets 3,4. The apertures 80 in the separation sheet 8 are partly closed by closure flaps 81, which are hingedly attached to the lower rim of the apertures 80. The front sheet 4 and the separation sheet 8 delimit a front compartment 11 which accommodates a blister-type package 100. The blister-type package 100 comprises a layer 103 of preferably transparent or translucent plastic, which is provided with outwardly extending compartments, cavities or blisters 101 for receiving the pharmaceutical product, e.g. a pill or a tablet T. A rupturable or puncturable second layer 102, which is very often made of aluminum foil, is laminated to the open side of the plastic layer 103. In a rear compartment 12, which is delimited by the separation sheet 8 and the rear sheet 4 a shutter sheet 9 is accommodated slidingly in between an initial first end position and a second end position. The shutter sheet 9 is provided with apertures 90, which correspond in number to those in the front, rear and separation sheets 3,4,8. The arrangement of the apertures 90 in the shutter sheet 9 is such, that in its initial first end position the material of the shutter sheet 90 webs between the openings 30,40 and apertures 80 in the front and rear sheets 3,4 and the separation sheet 8, respectively (FIG. 12).

By applying pressure to the shutter sheet 9, it is moved into its second end position in which its apertures 90 are in registry with the openings 30,40 and with apertures 80 in the front and rear sheets 3, 4 and in the separation sheet 8, respectively (FIG. 13). In this open position pressure may be applied to a blister 101, which protrudes through a respective opening 30 in the front sheet 3. Thereby the second layer 102 of the blister-type package 100 is ruptured and the pill or tablet T contained therein, falls out through the respective opening 40 in the rear sheet 4. During the rupturing process of the second layer 102 of the blister-type package 100 the closure flap 81 which partly covers the corresponding aperture 80 in the separation sheet 8 is bent outwardly and protrudes from the respective opening 40 in the rear sheet 4 (FIG. 13).

As the shutter sheet 9 is released it is biased back towards its initial first end position, due to spring force (FIG. 14). When returning the bottom rim of the aperture 90 in the shutter sheet 9 abuts against the outwardly bent closure flap 81 and pushes it back into the dispenser 1. Due to the closure flap 81 being pushed back the ruptured residues of the second layer 102 are also pushed back towards the emptied blister 101. By this function of the closure flaps 81 it is ensured that the residues of the ruptured second layer 102 of the blister-type package 100 do not hinder the sliding activation of the shutter sheet 9, and that the dispenser always has a clean appearance.

While it is not shown it is apparent to the skilled artisan, that operation of the shutter sheet also enables to access the cavity in the spring-like element, which biases the shutter sheet into its initial first end position. Thus, a half pill or tablet may be safely stored inside the multiple-use package and released when desired.

In order to release a pill, tablet, capsule or the like from the blister-type package 100 two handling operations must be accomplished at the same time—pushing the shutter sheet from a its initial first end position, in which the openings in the rear sheet are closed to a second end position, in which the openings are opened; and applying pressure on a blister in order to rupture the second layer of the blister type package until the pill, tablet, capsule or the like falls out. These two simultaneous handling operations may not be performed by children, but are easily accomplished by adults including elderly people. The multiple-use dispenser is designed to be re-fillable, thus once a blister-type package is emptied it may be removed and a new one may be inserted. For further convenience of the patient or the person administering the pill, tablet, capsule or the like in another embodiment of the multiple-use dispenser there may be provided an outer, secondary package, in which the housing and at least one blister-type package containing the pills, tablets, capsules or like pharmaceutical articles are unloosably but releasably accommodated. Thus, the pharmaceutical articles and the multiple-use dispenser may be offered as a set. For example, the secondary package may be of the folder type. For attachment of the housing and the blister-type package(s) at the inside of the secondary package a strip of adhesive tape or the like, which allows a repeated attachment and removal may be provided. The secondary package may also contain printed information about the pharmaceutical product and about the mode of administration thereof.

The invention claimed is:

1. Multiple-use dispenser for articles contained in blister-type packages for pharmaceutical products,
   the dispenser comprising a housing (2) with at least one opening for dispensing an article (T) from a blister package (100) contained therein,
   the housing (2) comprising a front and a rear sheet (3,4) interconnected with one another along their longitudinal edges and having a closed end (5) and an open end (6) on opposite longitudinal ends thereof, the open end (6) comprising a closure element enabling replacement of the blister package,
   the front and rear sheets (3,4) each being provided with at least one opening (30,40), the openings (30,40) of the front and rear sheets (3,4) being arranged so as to be in permanent registry with one another,
   the dispenser further comprising a shutter sheet (9) arranged within the housing (2),
   the shutter sheet (9) being adapted to be moved longitudinally from a first end position, in which the respective at least one opening (30,40) in the front and rear sheets (3,4) is closed to a second end position, in which an aperture (90) of the shutter sheet (9) is in registry with the respective at least one opening (30,40) in the front and rear sheets (3,4),
   the shutter sheet (9) being resiliently biased towards the first end position in which it closes the respective at least one opening (30,40) in the front and rear sheets (3,4),
   wherein between the shutter sheet (9) and the front sheet (3) of the housing (2) a compartment (11) is provided for accommodating a blister package (100).

2. Multiple-use dispenser according to claim 1, wherein:
   the front and rear sheets (3, 4) are each provided with a corresponding plurality of openings (30, 40),
   the openings (30) in the front sheet (3) and the corresponding openings (40) in the rear sheet (4) being arranged to be in permanent registry with one another, and
   the shutter sheet (9) comprises a plurality of apertures (90) arranged to correspond to the the openings in the front and rear sheets (3,4).

3. Multiple-use dispenser according to claim 2, wherein:
   the openings (30,40) in the front and rear sheets (3,4) are arranged in two longitudinal columns, and
   the shutter sheet (9) comprises a corresponding arrangement of apertures (90),
   wherein, in the first end position of the shutter sheet (9):
   the shutter sheet closes the openings (30,40) in the front and rear sheets, and
   the apertures (90) in the shutter sheet (9) are in registry with web material portions of the front and rear sheets (3,4) between adjacently arranged openings (30,40) of the longitudinal columns of openings in the front and rear sheets (3,4).

4. Multiple-use dispenser according to claim 3, wherein seven openings or a multiple thereof are arranged in each longitudinal column of openings (30,40), and in that the shutter sheet (9) is provided with a corresponding arrangement of apertures (90).

5. Multiple-use dispenser according to claim 1, wherein at the open end (6) of the housing (2) the front and rear sheets (3, 4) each are provided with a central recess (10) allowing access to the shutter sheet (9) for actuation thereof.

6. Multiple-use dispenser according to claim 1, wherein the shutter sheet (9) at a longitudinal foot end thereof is provided with a spring element (15) which in the assembled state is supported by the closed end (5) of the housing (2).

7. Multiple-use dispenser the dispenser comprising a housing (2) with at least one opening for dispensing an article (T) from a blister package (100) contained therein, the housing (2) comprising a front and a rear sheet (3,4) interconnected with one another along their longitudinal edges and having a closed end (5) and an open end (6) on opposite longitudinal ends thereof, the open end (6) comprising a closure element enabling replacement of the blister package, the front and rear sheets (3,4) each being provided with at least one opening (30,40), the openings (30,40) of the front and rear sheets (3,4) being arranged so as to be in permanent registry with one another, the dispenser further comprising a shutter sheet (9) arranged within the housing (2), the shutter sheet (9) being adapted to be moved longitudinally from a first end position, in which the respective at least one opening (30,40) in the front and rear sheets (3,4) is closed to a second end position, in which an aperture (90) of the shutter sheet (9) is in registry with the respective at least one opening (30,40) in the front and rear sheets (3,4), the shutter sheet (9) being resiliently biased towards the first end position in which it closes the respective at least one opening (30,40) in the front and rear sheets (3,4), wherein:

between the shutter sheet (9) and the front sheet (3) of the housing (2) a compartment (11) is provided for accommodating a blister package (100), the housing (2) further comprises a separating sheet (8) extending longitudinally and separating the housing (2) into a front compartment (11) for accommodating the blister package (100) and a rear compartment (112) for the shutter sheet (9), and the separating sheet (8) is provided with apertures (80), which are in permanent registry with the openings (30,40) in the front and rear sheets (3,4) and which each are partially closed by at least one closure flap (81) that is hingedly attached to the separating sheet (8) at a lower rim of each aperture (80).

8. Multiple-use dispenser according to claim 7, wherein the closure flaps (81) are formed integrally with the separating sheet (8).

9. Multiple-use dispenser the dispenser comprising a housing (2) with at least one opening for dispensing an article (T) from a blister package (100) contained therein, the housing (2) comprising a front and a rear sheet (3,4) interconnected with one another along their longitudinal edges and having a closed end (5) and an open end (6) on opposite longitudinal ends thereof, the open end (6) comprising a closure element enabling replacement of the blister package, the front and rear sheets (3,4) each being provided with at least one opening (30,40), the openings (30,40) of the front and rear sheets (3,4) being arranged so as to be in permanent registry with one another, the dispenser further comprising a shutter sheet (9) arranged within the housing (2), the shutter sheet (9) being adapted to be moved longitudinally from a first end position, in which the respective at least one opening (30,40) in the front and rear sheets (3,4) is closed to a second end position, in which an aperture (90) of the shutter sheet (9) is in registry with the respective at least one opening (30,40) in the front and rear sheets (3,4), the shutter sheet (9) being resiliently biased towards the first end position in which it closes the respective at least one opening (30,40) in the front and rear sheets (3,4), wherein:

between the shutter sheet (9) and the front sheet (3) of the housing (2) a compartment (11) is provided for accommodating a blister package (100), the rear sheet (4) is provided with an additional opening (41) which is in registry with a cavity (13), and the shutter sheet (9) comprises an additional aperture (91) arranged such that in the first end position of the shutter (9) the shutter closes the cavity (13) while in the second end position the additional aperture (91) allows access thereto.

10. Multiple-use dispenser according to claim 9, wherein the shutter sheet (9) at a longitudinal foot end thereof is provided with a spring element (15) which in the assembled state is supported by the closed end (5) of the housing (2) and the cavity (13) is provided in a body (16) of the spring element (15) which is mounted to the longitudinal foot end of the shutter sheet (9).

* * * * *